J. HARRIS.
GAUGE.
APPLICATION FILED NOV. 9, 1918.
1,437,176.
Patented Nov. 28, 1922.
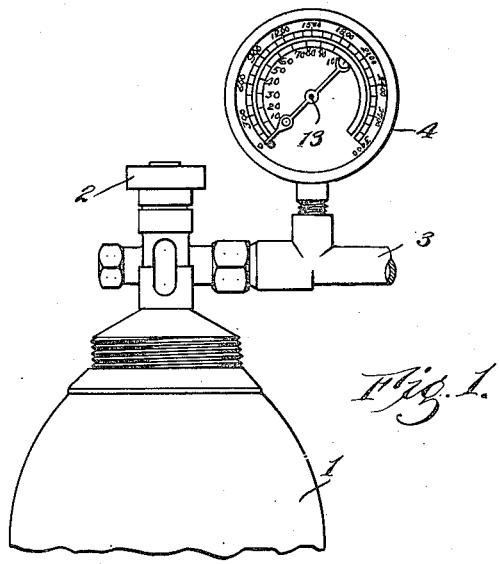
Fig. 1.
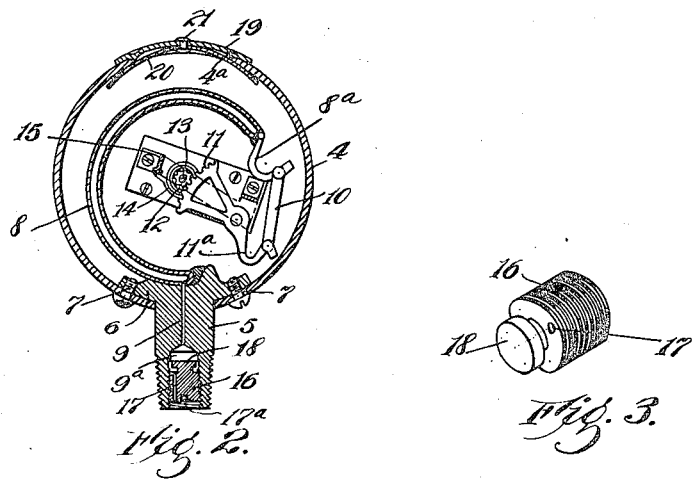
Fig. 2.
Fig. 3.
Inventor
John Harris,
By Hull, Smith, Brock & West.
Atty's Patented Nov. 28, 1922.

1,437,176

UNITED STATES PATENT OFFICE.

JOHN HARRIS, OF LAKEWOOD, OHIO, ASSIGNOR OF ONE-HALF TO JAMES R. ROSE, OF EDGEWORTH, PENNSYLVANIA.

GAUGE.

Original application filed August 10, 1917, Serial No. 185,417. Divided and this application filed November 9, 1918. Serial No. 261,793.

*To all whom it may concern:*

Be it known that I, JOHN HARRIS, a citizen of the United States, residing at Lakewood, in the county of Cuyahoga and State of Ohio, have invented a certain new and useful Improvement in Gauges, of which the following is a full, clear, and exact description, reference being had to the accompanying drawings.

This invention relates to gauges and more particularly to gauges of the Bourdon type. The general object of the invention is to reduce to a minimum the danger of rupture of and injury to the tubes employed in such gauges.

In the drawings forming a part hereof Fig. 1 represents a side elevation of the top of a gas tank having a gauge of the Bourdon type connected to the pipe leading therefrom. Fig. 2 is a view, partly in section and partly in elevation, of the said gauge, the cover being removed; and Fig. 3 a detail in perspective of the plug which serves to control the admission of gases to the gauge and to safeguard the Bourdon tube against rupture.

Describing by reference characters the various parts illustrated herein, 1 denotes the upper portion of a tank such as is used for the storage of gases under high pressure and 2 the valve controlling the supply of gas from the tank through a conduit 3. 4 denotes the cylindrical casing wall of the gauge, said wall being provided with an opening in the bottom thereof for the reception of the nipple 5. This nipple is provided with the usual head 6 by means of which it is secured to the cylindrical wall 4, as by means of screws 7. 8 denotes the Bourdon tube which extends to the head 6 and communicates with the restricted bore 9 of the nipple. The lower end of the nipple bore is enlarged, as shown at 9ª, and the nipple is externally threaded whereby it is secured to a connection extending upwardly from the conduit 3.

The outer end of the tube 8 is connected by a curved extension 8ª and a link 10 with a curved extension 11ª of a gear segment 11, said segment meshing with a pinion 12 on a pointer shaft 13. A hair spring 14 is also connected under tension to the pointer shaft and to the bracket 15. The parts thus far described are of usual construction.

Threaded into the bore 9ª is a plug 16, said plug having a restricted passageway 17 therethrough of less cross-sectional area than the bore 9 and being provided with a head 18 spaced from said passageway and overhanging the discharge end thereof. The head 18 will preferably be of such size as to fit within the bore 9ª and provide an annular passageway between said head and the wall defining said bore. The plug may be provided with a slot 17ª for the reception of a screw driver or other instrument by which it may be inserted into, withdrawn from, and adjusted along the bore 9ª. Communication between the bore 9ª and tube 8 is effected by the restricted bore 9 so that the pressure in the gauge may always rise slowly, thus conserving the integrity and accuracy of the mechanism.

The top of the cylindrical wall 4 is provided with an opening, indicated at 4ª. This opening is adapted to be closed by means of a plate 19 having an area sufficiently greater than the area of said opening to overlap the same. Secured to the lower central portion of the plate 19 is a flat spring 20, the spring and plate being shown as connected by a rivet 21. This spring is preferably longer than the plate 19 and the opening 4ª and is shown as extending longitudinally of said plate. The plate 19 may be applied to the cylindrical casing wall 4 by flexing the ends of the spring toward each other so as to permit them to be inserted within the opening 4ª. The spring will then hold the plate seated over the opening.

In operating with gases, it sometimes happens that, through faulty manipulation, a high pressure is suddenly developed within the conduit 3 and within the connections leading to the gauge. With gauges as ordinarily constructed, the gas under these conditions will strike a blow upon the metal of the tube 8 which will frequently result in its rupture or permanent injury. By using the narrow passageway 17, the gas is prevented from entering the tube 8 rapidly; furthermore, the head 18 acts as a baffle to prevent a stream of gas under high pressure from striking the tube suddenly. In other words, the restricted passageway 17 and the baffle head 18 prevent the rupture or permanent injury of the tube 8 through the development of a high pressure in the pipe 3 lasting for a comparatively short period. However, should excessive pressure be maintained for a considerable period of time and result in rupturing the tube, the gauge wall 4, being incapable of withstanding this pressure, will also be ruptured, heretofore with danger to the operator and the by-standers. In my device, upon the rupture of the tube 8, the plate 19 will be blown upwardly, thus preserving the casing and, because of its location at the top of the gauge, will not injure any person who may be in the vicinity. The means for preventing the rupture of the casing 4 by the employment of the blow-out plate 19 is shown, described and claimed in my application No. 185,417 filed August 10, 1917 (Patent No. 1,291,497) and of which application this application is a division.

While the plug 16 is particularly advantageous in connection with high-pressure gases, its field of usefulness is not limited to gases under such pressures. It will prevent fluctuations of pressure in the tube and consequent oscillation of the pointer in connection with gauges operating under pressure of five pounds and less. This is particularly true where the gauge is used in connection with a reciprocating pressure, or charging pump.

Having thus described my invention, what I claim is:—

1. In a gauge, the combination of a Bourdon tube, a source of gas supply, a conduit connecting said source with said tube, a plug within said conduit, adjacent to the said tube, said plug having a passageway therethrough of less cross sectional area than the portion of the conduit which extends from said plug to said tube, the said plug having a head overhanging the discharge end of said passageway.

2. In a gauge, the combination of a Bourdon tube, a nipple for connecting said tube to a conduit, a plug within said nipple having a restricted passageway therethrough, and a head carried by said plug and overhanging the discharge end of said passageway and providing with the adjacent inner wall of the nipple an annular passageway, said nipple having a passageway extending from said head to said tube.

3. In a gauge, the combination of a yielding indicator-actuating member, and means for conducting pressure fluid thereto, said means comprising a conduit communicating with said member, and a plug in said conduit adjacent to said member and having a restricted passageway therethrough, the said plug having a head overhanging the delivery end of said passageway.

4. In a gauge, the combination of a yielding indicator-actuating member, and means for conducting pressure fluid thereto, said means comprising a conduit communicating with said member, and a plug in said conduit adjacent to said member and having a restricted passageway longitudinally therethrough between the center and the circumference thereof, and a head carried by said plug and overhanging the delivery end of said passageway.

5. In a gauge, the combination of a yielding indicator-actuating member, and means for conducting pressure fluid thereto, said means comprising a conduit communicating with said member, and a plug in said conduit adjacent to said member and having a restricted passageway longitudinally therethrough between the center and the circumference thereof, and a head carried by said plug and overhanging the delivery end of said passageway, and forming a restricted passageway with the portion of the conduit surrounding the same.

In testimony whereof, I hereunto affix my signature.

JOHN HARRIS.